July 9, 1968  T. THORNE-THOMSEN  3,391,419
KNOB AND METHOD OF MAKING THE KNOB
Filed Nov. 23, 1965
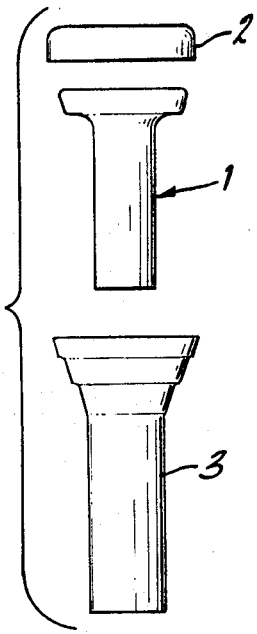
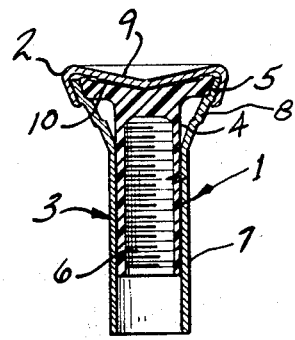
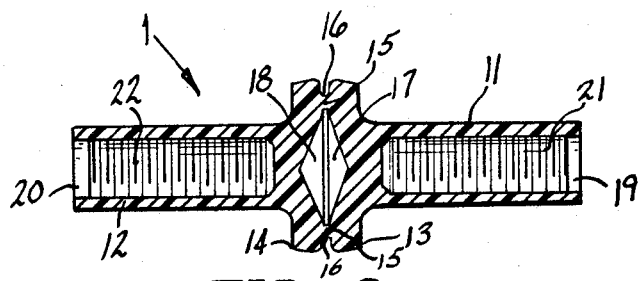
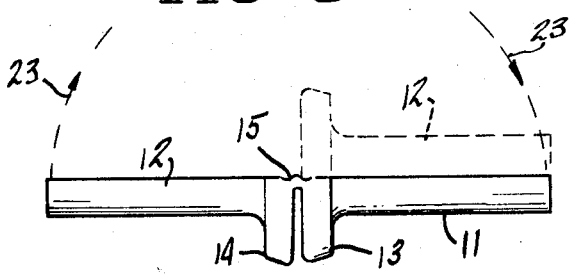
INVENTOR.
THOMAS THORNE-THOMSEN
BY
ATTORNEY

3,391,419
KNOB AND METHOD OF MAKING THE KNOB
Thomas Thorne-Thomsen, Godfrey, Ill., assignor to Olin Mathieson Chemical Corporation, a corporation of Virginia
Continuation-in-part of application Ser. No. 427,575, Jan. 25, 1965. This application Nov. 23, 1965, Ser. No. 514,750
7 Claims. (Cl. 16—121)

ABSTRACT OF THE DISCLOSURE

This invention relates to lock knobs and like articles having an internally threaded recess and a method for manufacture of the same. A lock knob is provided having a cylindrical external member and an internal plastic member which is internally threaded. The internally threaded plastic member is conveniently formed by molding cooperating halves which define the internal threads. A cap member is provided on the elongated body which covers the nonthreaded end of the plastic member.

---

This application is a continuation-in-part of my copending application Ser. No. 427,575, filed Jan. 25, 1965, now abandoned.

This invention relates in general to articles having internally threaded recesses, and more particularly to articles suitable for use as a knob or the like, and a novel method of producing such articles.

In many applications it is advisable to provide a knob having an internally threaded recess to receive the threaded end of a shaft or the like. Merely exemplary of such articles is the well-known knob employed with the locking rod of an automobile door lock. The locking rod typically projects upwardly from the interior of the automobile door, and the knob is attached thereto for manipulation by the occupants. Currently, such knobs are most often of a plastic material, either chrome-plated or colored to match the interior decor of the automobile. However, it has been found that there is a tendency of such knobs to strip off the locking rod. Additionally, the production of the current knobs is relatively expensive, as it is necessary to perform a separate tapping operation on a finished molded article, or to employ highly complex molds in forming the part.

According to the instant invention, it has been found that the disadvantages noted above may be obviated by providing a metal casing into which is inserted a uniquely designed plastic body. The plastic body may be produced by molding the body in a number of sections appropriately hinged together, each section having a portion of the desired internal thread, and folding the sections together to bring them into intimate abutting relationship with the recesses defining the desired internal thread.

It is accordingly a primary object of this invention to provide a novel article suitable for use as a knob or the like.

It is a further object of this invention to provide such an article having an internal thread adapted to securely receive the threaded end of a shaft or the like.

It is a still further object of this invention to provide such an article at a reasonable cost while still obviating the disadvantages of the prior art devices.

It is an even still further object of this invention to provide a novel method of producing such devices.

Other objects and advantages will become apparent to those skilled in the art as a discussion proceeds of a specific embodiment with reference to the drawings which form a part hereof, and in which:

FIGURE 1 is an exploded view of an article in accordance with this invention;

FIGURE 2 is a sectional view showing the parts of th article of FIGURE 1 in assembled relationship;

FIGURE 3 is a plan view of the molded part during production thereof; and

FIGURE 4 is a front elevational view of the molded part of FIGURE 3.

Taking the locking-rod knob discussed above as being exemplary, reference may be had to FIGURES 1 and 2 of the drawings. As illustrated in FIGURE 1, an elongated body 1 may be used as an insert or core within a casing 3 to be secured therein by an appropriate cap member 2. As best seen in FIGURE 2, the body 1, which may be for example of plastic, may have a cylindrical portion 4 and an internal thread 6 for engagement with a threaded member of the locking assembly, such as a locking rod, not shown. The casing 3 into which the body 1 is inserted and the cap 2 may be, for example, of brass and manufactured in any conventional manner. As shown, the casing 3 comprises a cylindrical portion 7 and an enlarged head portion 8 to receive the enlarged head portion 5 of the body 1. Cap 2 is of a configuration to closely surround the head portion 8 of casing 3 and be crimped thereon. If so desired, cap portion 2 may include a projection 9 for matching engagement with a similar recess 10 of the body 1 to provide a finger-receiving depression in the top of the knob. From the more detailed explanation below of the body 1, the advantages of the assembly just described will be evident.

As can be seen in FIGURE 3, the body 1 may be formed in a suitable mold, not shown, in the configuration of two mirror-image halves of the desired finished article, the two halves being joined at one end. Thus, the body 1 employed in the article shown in FIGURES 1 and 2 may be formed in a mold which would produce two semi-cylindrical sections 11 and 12 having enlarged semicylindrical head portions 13 and 14, respectively, joined together as by integral hinge portions 15. Portions 15 may each include a groove 16, for reasons to become evident. By the use of appropriate cores, recesses 17 and 18 may be provided in each of the head portions 13 and 14, respectively, also for reasons to become evident.

Within the semicylindrical section 11 there is formed by a suitable mold one-half of an internal thread, represented by the reference character 21, which thread communicates with one-half of a suitable semicylindrical recess 19. On matching section 12 there is provided a similar matching threaded recess 22, and a semicylindrical recess 20.

Referring now to FIGURE 4, it will be evident that the body 1 produced in the form shown in FIGURE 3 may be removed from the mold, and one-half of the body folded upon the other half around its central portion. Thus, as shown by the arrow 23, the section 12 may be folded along hinge portion 15 into intimate abutting relationship with section 11. The groove 16 increases the ability of the hinge portions 15 to be folded, and the recesses 17 and 18 when brought together form the recess 10 shown in FIGURE 2. Following the folding operation, the two sections in their abutting position, shown in phantom lines in FIGURE 4, may be appropriately secured together. For the application shown in FIGURES 1 and 2, no additional securing device is necessary, as the casing 3 performs this function. Thus, the body 1, after the folding operation, need only be slipped within the casing 3. Cap 2 is applied and crimped over the enlarged head 8 of casing 3 and the resulting assembly is ready for installation in the appropriate locking assembly.

It is to be emphasized that the configurations here shown are by way of example only. The concepts here disclosed may be employed with articles of any desired external shape, having any desired configuration of internal void. Thus, rather than an internal thread, a groove, a cavity, or a knurl may be developed dependent upon the desired use of the finished article. Similarly, the sections of the article need not be joined exclusively as shown; for example, the sections may be hinged side-by-side rather than at end portions, or at the ends opposite to the ends illustrated. The recesses in the mold forming the internal void in the article need not be mirror-images of each other; a desired nonsymmetrical void may dictate that the recesses in the various sections be of entirely different configurations. Furthermore, a particularly complex void may require that there be more than two sections of the molded body. It will be evident to thse skilled in the art that the present invention may be practiced by employing a greater number of molding sections appropriately hinged together so as to fold into the desired article.

As has been indicated above, the instant invention is particularly adapted to articles including plastic bodies, any of the well-known injection molding processes being suitable. The particular plastic employed may be of any desired composition; for example, polypropylene has been found highly suitable for the application illustrated. However, the instant invention is equally applicable to any material pliable enough to be folded about a suitable hinge portion thereof.

Accordingly, it is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. An article suitable for use as a knob or the like, comprising
   (A) an elongated body adapted for cooperation with a threaded shaft,
      (1) one end of said body having an enlarged periphery,
      (2) an internally threaded recess in communication with the other end of said body,
      (3) said body comprising two body sections, each having a recess defining one-half of said internally threaded recess, said body sections being in intimate abutting relationship with the recess thereof defining said internally threaded recess,
   (B) a tubular member surrounding said body,
      (1) one end of said member having an enlarged periphery closely receiving said one end of said body,
      (2) the other end of said member being open-ended for receiving a threaded shaft.

2. An article according to claim 1 wherein said body further includes at least two integral hinge members joining opposed faces of said two body sections.

3. An article according to claim 1 wherein said body is of a plastic material, and said member is of metal.

4. An article according to claim 1 further including a cap member covering said one end of said body and secured to said one end of said member.

5. An article according to claim 4 further including
   (A) a recess in the upper face of said one end of said body,
   (B) a projection on said cap member matching the configuration of said recess in the upper face of said one end of said body.

6. The method of producing an article suitable for use as a knob or the like wherein the article comprises an elongated member having one end closed and the other end internally threaded, the method comprising
   (A) molding a body of plastic comprising
      (1) first and second sections each having a first body portion including a recess defining one-half of the desired internal thread and a second body portion devoid of recesses, and
      (2) at least two hinge portions joining opposed faces of said first and second sections,
   (B) folding said body about said hinge portions to bring said first and second sections into intimate abutting relationship, with said recesses defining the desired internally threaded void, and
   (C) inserting said body into a casing having
      (1) a first casing portion closely receiving said first and second body sections for maintaining them in said intimate abutting relationship, and
      (2) a second, closed-end casing portion for closely receiving said second body portions.

7. The method of claim 6 wherein the step of inserting said body into said casing comprises
   (A) inserting said first and second body sections into said first casing portion, and
   (B) attaching said second casing portion to said first casing portion in a position closely receiving said second body portions.

References Cited

UNITED STATES PATENTS

| | | | |
|---|---|---|---|
| 301,303 | 7/1884 | Taylor | 287—534 |
| 436,308 | 9/1890 | Diss | 85—85 |
| 2,227,271 | 12/1940 | Noelting | 16—38 |
| 3,174,178 | 3/1965 | La Branche et al. | 16—121 |

FOREIGN PATENTS 676,144    7/1952    Great Britain.

BOBBY R. GAY, *Primary Examiner.*

D. L. TROUTMAN, *Assistant Examiner.*